(12) United States Patent
Juels et al.

(10) Patent No.: US 7,602,904 B2
(45) Date of Patent: Oct. 13, 2009

(54) ORDER INVARIANT FUZZY COMMITMENT SYSTEM

(75) Inventors: Ari Juels, Brookline, MA (US); Madhu Sudan, Somerville, MA (US)

(73) Assignee: RSA Security, Inc., Bedford, MA (US)

( * ) Notice: Subject to any disclaimer, the term of this patent is extended or adjusted under 35 U.S.C. 154(b) by 562 days.

(21) Appl. No.: 09/994,476

(22) Filed: Nov. 26, 2001

(65) Prior Publication Data

US 2002/0120592 A1 Aug. 29, 2002

Related U.S. Application Data

(60) Provisional application No. 60/253,291, filed on Nov. 27, 2000.

(51) Int. Cl.
*H04L 1/00* (2006.01)
*H04L 9/28* (2006.01)

(52) U.S. Cl. .................................................. 380/28
(58) Field of Classification Search ................. 713/202
See application file for complete search history.

(56) References Cited

U.S. PATENT DOCUMENTS

| | | | | |
|---|---|---|---|---|
| 6,075,905 A * | 6/2000 | Herman et al. | ............. | 382/284 |
| 6,363,485 B1 * | 3/2002 | Adams et al. | ............... | 713/186 |
| 6,516,092 B1 * | 2/2003 | Bachelder et al. | ........... | 382/181 |
| 6,862,687 B1 * | 3/2005 | Suzuki | ........................ | 726/18 |
| 2006/0123241 A1 * | 6/2006 | Martinian et al. | ........... | 713/186 |
| 2007/0011464 A1 * | 1/2007 | Gorelik et al. | ............... | 713/186 |
| 2008/0238845 A1 * | 10/2008 | Kanou | ........................ | 345/87 |

OTHER PUBLICATIONS

Davida et al., "On enabling secure applications through off-line biometric identification", Security and Privacy, 1998. Proceedings., IEEE, 1998.*
Rao et al., "Private-key algebraic-code encryptions" IEEE Transactions on Information Theory, 1989.*
Alabbadi et al., "Integrated security and error control for communication networks using the McEliece cryptosystem;Security Technology", 1992. Crime Countermeasures, Proceedings. Institute of Electrical and Electronics Engineers 1992 International.*
Golomb, S.W., "On the Classification of Boolean Functions", Transactions of the Information Theory Group of the IEEE, Jun. 1959.*
Kilian, "Founding Cryptography on Oblivious Transfer", ACM, 1988.*
Stern, "A new identification scheme based on syndrome decoding", Springer-Verlag, 1998.*

(Continued)

*Primary Examiner*—Matthew B Smithers
*Assistant Examiner*—Jeffery Williams
(74) *Attorney, Agent, or Firm*—BainwoodHuang

(57) ABSTRACT

A system provides an order-invariant fuzzy commitment scheme. In an exemplary embodiment, the scheme includes receiving a first set of elements and selecting a polynomial for encoding an item under the first set of elements to generate an order-invariant fuzzy commitment of the item. The system utilizes an error-correcting code for decommitting the item if a second set of elements has a specified level of overlap with the first set of elements.

22 Claims, 4 Drawing Sheets

OTHER PUBLICATIONS

Rick, "Observations on the Application of Error Correcting Codes to Public Key Encryption", IEEE, 1990.*

Juels et al., "A Fuzzy Commitment Scheme", Proceedings of the 6th ACM conference on Computer and communications security, 1999.*

Juels et al., "A Fuzzy Commitment Scheme", ACM, Oct. 1999, pp. 28-36.*

M. Sudan. Decoding of Reed-Solomon codes beyond the error-correction bound. Journal of Complexity, 13(1):180-193, 1997.*

M. Sudan, "Maximum Likelihood Decoding of Reed Solomon Codes", 1996, IEEE Symposium on Foundations of Computer Science.*

M. Sudan, "List Decoding: Algorithms and Applications", 2000, SIGACTN: SIGACT News (ACM Special Interest Group on Automata and Computability Theory.*

* cited by examiner

ORDER INVARIANT FUZZY COMMITMENT SYSTEM

CROSS REFERENCE TO RELATED APPLICATIONS

This application claims the benefit of U.S. Provisional Patent Application No. 60/253,291, filed on Nov. 27, 2000, the disclosure of which is incorporated herein by reference.

STATEMENT REGARDING FEDERALLY SPONSORED RESEARCH

Not Applicable.

FIELD OF THE INVENTION

The present invention relates generally to cryptography and, more particularly, to systems encrypting and decrypting information and/or user or device authentication.

BACKGROUND OF THE INVENTION

As is known in the art, cryptography generally relies upon exactitude to provide the desired level of security. For example, most ciphers require presentation of an exactly correct decryption key to permit recovery of a plaintext. Similarly, the output of a hash function is intolerant of small perturbations to input values. Changing even one bit at random in a pre-image usually causes a change in about half of the bits of the corresponding image. Such intolerance of even small errors in cryptographic primitives stems naturally from the guiding design principals of "confusion" and "diffusion." Such exactitude in cryptographic systems is of critical importance in many situations. Permitting an attacker to alter even a single bit in a sensitive message, such as a funds transfer or patient record, can be quite dangerous.

At the interface between cryptographic systems and their human users, however, the ability to achieve exactitude breaks down. Human beings tend to misremember private information, make typos in passwords, and present fingers to fingerprint readers in a slightly different way each time. In addition, the inexact nature of human interaction with computers is not confined to errors. Programs that answer Web queries or match profiles of prospective business partners, for example, handle relatively high levels of uncertainty and imprecision.

Various attempts have been made to address so-called "fuzziness" in user input. One example is provided by graphical password systems, in which a user sketches a secret picture in lieu of entering a text password. Users generally sketch a given picture a slightly different way each time. Thus, graphical password systems should be tolerant of sketch variations, while not sacrificing security. Another known system enables users to recover passwords by answering a series of questions. In recognition of the unreliability of human memory, the system can permit users to answer some of these questions incorrectly.

While such systems can compensate for some level of user error, these systems depend upon the order of the user input. That is, known systems require user input in a predetermined order. Thus, these systems provide a limited level of fuzziness in the commitment and decommitment process.

It would, therefore, be desirable to overcome the aforesaid and other disadvantages of known commitment schemes.

SUMMARY OF THE INVENTION

The present invention provides a system having a fuzzy commitment scheme that is order-invariant. With this arrangement, a user can successfully interact with a secure system by providing predetermined information in no particular order. While the invention is primarily shown and described in conjunction with biometric systems, it is understood that the invention is applicable to systems in general in which the entry of order-invariant security information is desirable.

In one aspect of the invention, a system provides order invariant fuzzy commitment of an item of information, such as a plaintext, by receiving a first set of elements and selecting a polynomial for encoding the item under the first set of elements. This arrangement generates an order-invariant fuzzy commitment of the plaintext. In one embodiment, the system utilizes a Reed-Solomon code error-correcting code, in which each codeword corresponds to a polynomial. To decommit the plaintext, the system receives a second set of elements from a user that desires to obtain the plaintext. If the first and second sets have a predetermined level of overlap, then the plaintext is decommitted.

In a further aspect of the invention, a biometric system includes a controller module coupled to a commitment module and to a decommitment module. The system further includes a scanner for receiving biometric information from users requesting authentication and a database for storing biometric templates. The commitment and decommitment modules implement an order-invariant fuzzy commitment scheme that determines whether biometric information from the scanner overlaps with a template for the user to a predetermined extent. If there is sufficient overlap, then the user can be authenticated.

In one particular embodiment, a biometric system utilizes fingerprint information to implement an order-invariant fuzzy commitment scheme. For each new user, the system receives a set of information corresponding to a fingerprint image from a scanner. The system commits a key kappa under a set of symbols derived from the fingerprint information.

When a user requests authentication from the system, the system acquires a fingerprint image from the scanner. This image is compared with the template for the user. If the template and the image overlap by greater than a predetermined amount, then the system authenticates the user.

In one particular embodiment, a key kappa is committed to under the fingerprint data to form a commitment R. For user authentication, the user provides a new set of fingerprint data, with which the user tries to decommit R. After successful decommitment, the key kappa can subsequently be used as an authentication key. That is, user authentication is achieved through proof of possession of kappa, either by sending kappa explicitly or using it in a cryptographic authentication protocol of some kind.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
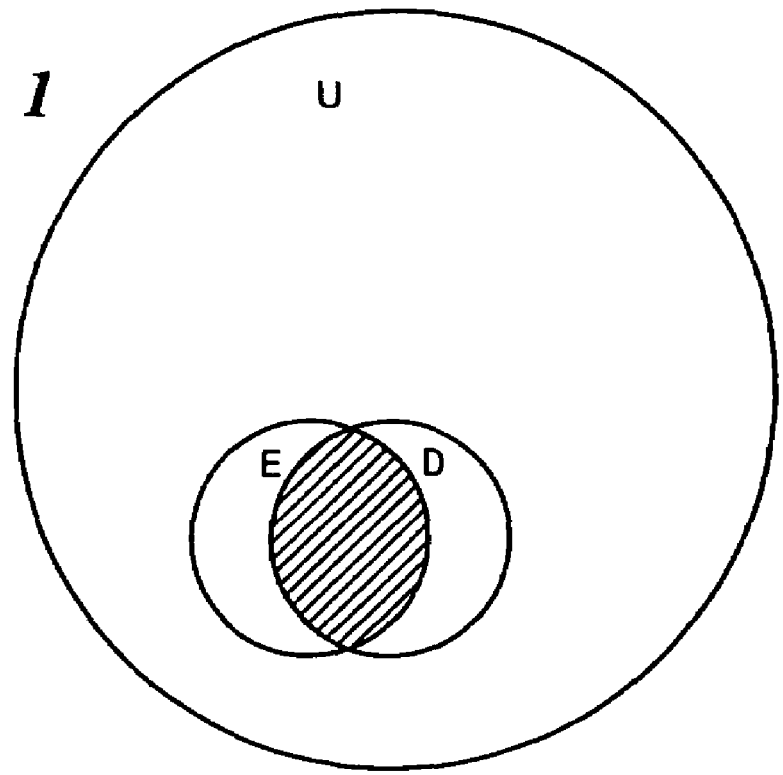
FIG. 1 is a pictorial representation of overlap between first and second sets within a universe that can form the basis for order-invariant fuzzy commitment and decommitment in accordance with the present invention.
Figure 2:
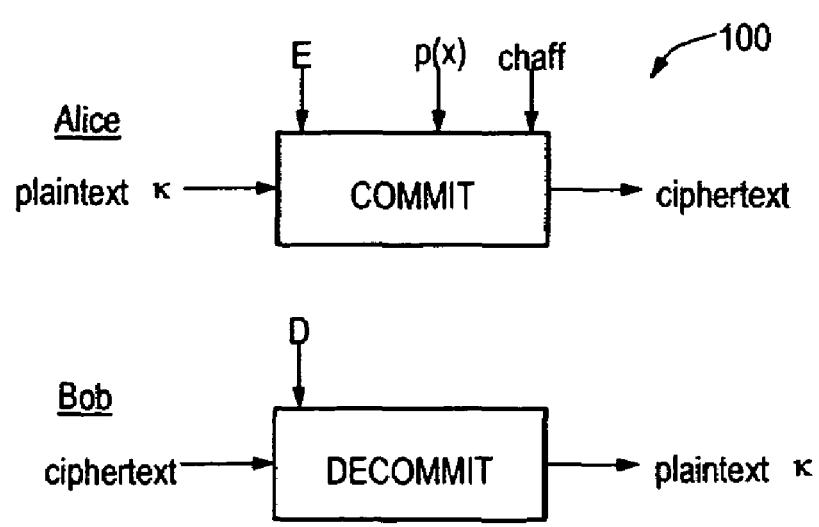
FIG. 2 is a schematic block diagram of a system having order-invariant fuzzy commitment in accordance with the present invention.

FIGS. 1-2 show an exemplary system 100 having an order-invariant fuzzy commitment scheme in accordance with the present invention. The system 100 enables a user to commit (or encrypt) an item of information, such as a plaintext κ, under a first set or list E of distinct elements in universe U. The resultant cipher can be decommitted under a second list D that overlaps to a predetermined level with the first list E. The ordering of the first and second lists E, D has essentially no influence on the commitment or decommitment process. The system is also tolerant of bit-level errors.

In an exemplary embodiment, Alice desires to commit a plaintext κ under a first list E. In one embodiment, a polynomial p in a single variable is selected such that the polynomial p encodes plaintext κ. Alice computes evaluations of p on input values corresponding to the elements of the first list E. More particularly, Alice projects a set of values specified by the first list E onto points that lie on the polynomial p. Alice then selects a number of random "chaff" points that do not lie on the polynomial p.

It is understood that chaff refers to the intentional addition/corruption of data to thwart an attacker. The entire collection of points, both those that lie on the polynomial p and the random chaff points, together constitute a commitment of p (that is, κ), which can be referred to a collection of points or target set R.

Figure 3:
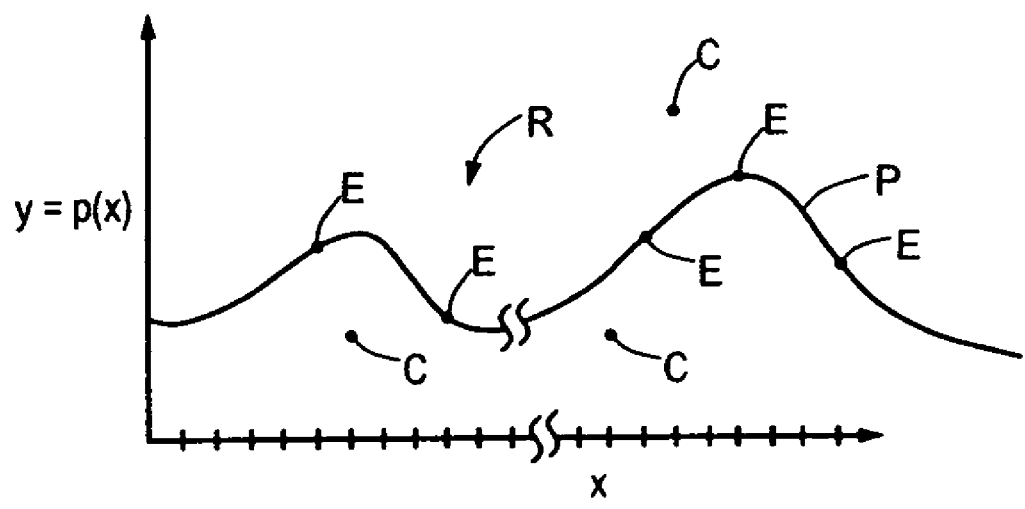
FIG. 3 is a graphical depiction of a polynomial used to encrypt an item over a first set of elements in accordance with the present invention.

As shown in FIG. 3, the first list E can be considered to identify points in R that lie on the polynomial p, so as to specify the polynomial p. The elements in the list E can be mapped to the x-axis and corresponding points on the y-axis, such that $y_i=p(x_i)$. Other points are chaff points C for thwarting an attacker from discovering any information encoded under the list E. The collection of points R includes the points in E, which lie on the polynomial p, and the chaff points C, which do not lie on the polynomial to confuse an attacker.

Bob can attempt to decommit the plaintext κ with a second list D. If the second list D overlaps "substantially" with the first list E, as defined below, then the second list D identifies points in R that lie on the polynomial p to enable Bob to recover a set of points that is largely correct. Using error correction, which can be in the form of an error-correcting code, Bob is then able to reconstruct the polynomial p, and thereby the plaintext κ. If the second list D does not overlap substantially with the first list E, then it is infeasible for Bob to learn κ. If D overlaps "somewhat", then he may still be able to recover κ, as described below.

As an example, the system can be described in conjunction with the so-called movie lover's problem. Alice compiles a list E of favorite movies. Alice encrypts some identifying information, such as contact information, or a key κ for a ciphertext thereof, under the list E using an order-invariant fuzzy commitment scheme in accordance with the present invention. Alice then posts the resulting ciphertext to a public location, such as a bulletin board. Alice desires to enable those with similar tastes in movies to obtain her identifying information.

If Bob's list of favorite movies D overlaps substantially with Alice's list E, then Bob can use it to decrypt Alice's identifying information. Otherwise, Bob must guess Alice's favorite movies, which is quite a difficult task in view of the number of available movie titles.

In general, a method for creating an order-invariant fuzzy commitment in accordance with the present invention includes receiving an input element A comprising a sequence of one or more values $a_1, a_2, \ldots, a_n$ from a predetermined set F and generating a codeword c of an error-correcting code. In one embodiment, a bijective function phi is applied to an input secret κ to obtain the codeword c. A sequence E of coordinates is constructed, which can be provided as pairs of the form $(x_i, y_i)$ for i in $\{1, 2, \ldots n\}$ wherein $x_i$ is an integer representation of input element value $a_i$, and $y_i$ is the $x_i$th symbol in the codeword c. The resultant sequence E can then be output. Prior to outputting the sequence, the method can include reordering the pairs in the sequence E in ascending order, for example, of the $x_i$ values of the coordinate pairs, or else in random order.

Chaff can be added to the sequence E to thwart an attack. In one embodiment, the added chaff comprises a set of pairs of the form (x,y) such that x does not lie in the input sequence A and y is generated at random. The chaff can include sets of pairs of the form (x,y) such that one or more values x do lie in the input sequence A and y is generated at random. It is understood that, in general, the chaff will be inserted within a range of values corresponding to a range of actual values.

An exemplary method for decommitting an order-invariant fuzzy commitment in accordance with the present invention includes receiving a second input element B comprising a sequence of one or more values $b_1, b_2, \ldots, b_m$ from a predetermined set F and generating or otherwise receiving an order-invariant fuzzy commitment. In one embodiment, the method further includes constructing a second set of integers $x_{i'}, \ldots x_{m'}$ representing respectively the values $b_1, b_2, \ldots b_m$ in the second sequence B. A set E' of pairs $(x_i, y_i)$ in E is then selected such that $x_i = x_{j'}$ for some $x_{j'}$. An error-correcting function can then be applied to the set E'. Note that the decommitment set B is not necessarily of the same cardinality as the commitment set E.

In another aspect of the invention, a method for creating a reordering-tolerant fuzzy commitment includes receiving an input element A comprising a sequence of one or more values $a_1, a_2, \ldots, a_n$ and receiving or generating a codeword c of an error-correcting code. The method further includes constructing a sequence E of one or more data elements in a manner responsive to the input element A and the code c and outputting the sequence E.

A method for decrypting the reordering-tolerant fuzzy commitment includes receiving a second input element B comprising a sequence of one or more values $b_1, b_2, \ldots, b_m$, and the sequence E. A function d is then applied to the second input element B and the sequence E; this function d outputs a value c'=d(B,E) with the property that d(V,E)=c for at least one possible value of V, with the following property. The value V comprises a third sequence of $m_V$ elements such that at least $m_V/2$ of these values differ from those in the sequence $a_1, a_2, \ldots, a_n$.

It is understood that the order-invariant fuzzy commitment scheme of the present invention is applicable to a wide variety of areas including securely matching buyer and seller profiles in e-business applications, security interface applications, such as those arising in biometric identification systems, and enhanced password schemes, such as so-called "personal entropy" schemes. It is further understood that the terms "encryption" and "commitment" are used interchangeably, as are the terms "decryption" and "decommitment."

Further details of the inventive order-invariant fuzzy commitment scheme are now described. The scheme operates over a universe U and a field F of cardinality q. The system commits (or encrypts) a plaintext value $\kappa \in F^k$ under a secret key (i.e., set) $E \in U^t$, for protocol parameters k and t, where the value k defines the number of symbols in $\kappa$, while t defines the size of the set being used for the commitment. An encryption algorithm ENC takes as input an item, such as a plaintext $\kappa$, and a secret key E and outputs a ciphertext $Y \in F^r$ for some security parameter r, where the variable r quantifies the number of correct points plus the number of chaff, i.e., the overall size of the commitment. In one particular embodiment, the encryption algorithm ENC is probabilistic.

A corresponding decryption algorithm DEC takes as input a ciphertext $Y \in F^r$ and a decryption key (i.e., set) $D \in U^t$. The output of the decryption algorithm DEC is a plaintext value $\kappa' \in F^k$, or else 'nil', if the algorithm is unable to extract a plaintext.

The pair of order invariant encryption/decryption algorithms ENC/DEC should enable reconstruction of the plaintext $\kappa$ when the decryption key D is "close" to the encryption key E. At the same time, the ciphertext Y by itself should not reveal (easily computable) information about the plaintext $\kappa$. In an exemplary embodiment, the secret keys D and E are sets whose ordering does not impact the encryption/decryption process.

The requirements of a desirable pair of encryption/decryption algorithms ENC, DEC for an order-invariant fuzzy commitment scheme in accordance with the present invention can be formalized, as set forth below. A probability can be considered negligible if it smaller than any positive polynomial in t and r. A probability is considered overwhelming if it is larger than 1–$\zeta$, where $\zeta$ is some negligible quantity.

An encryption/decryption algorithm pair (ENC, DEC) with parameter set (k, t, r) is complete with $\epsilon$-fuzziness if the following holds: for every $\kappa \in F^k$, and every pair of sets E, $D \in U^t$ such that $\epsilon \geq |E-D|$, it is the case that DEC(D, ENC(E, $\kappa$))=$\kappa$ with overwhelming probability, where E defines an encryption set, D defines a decryption set and $\epsilon$ denotes a level of overlap.

Figure 4:
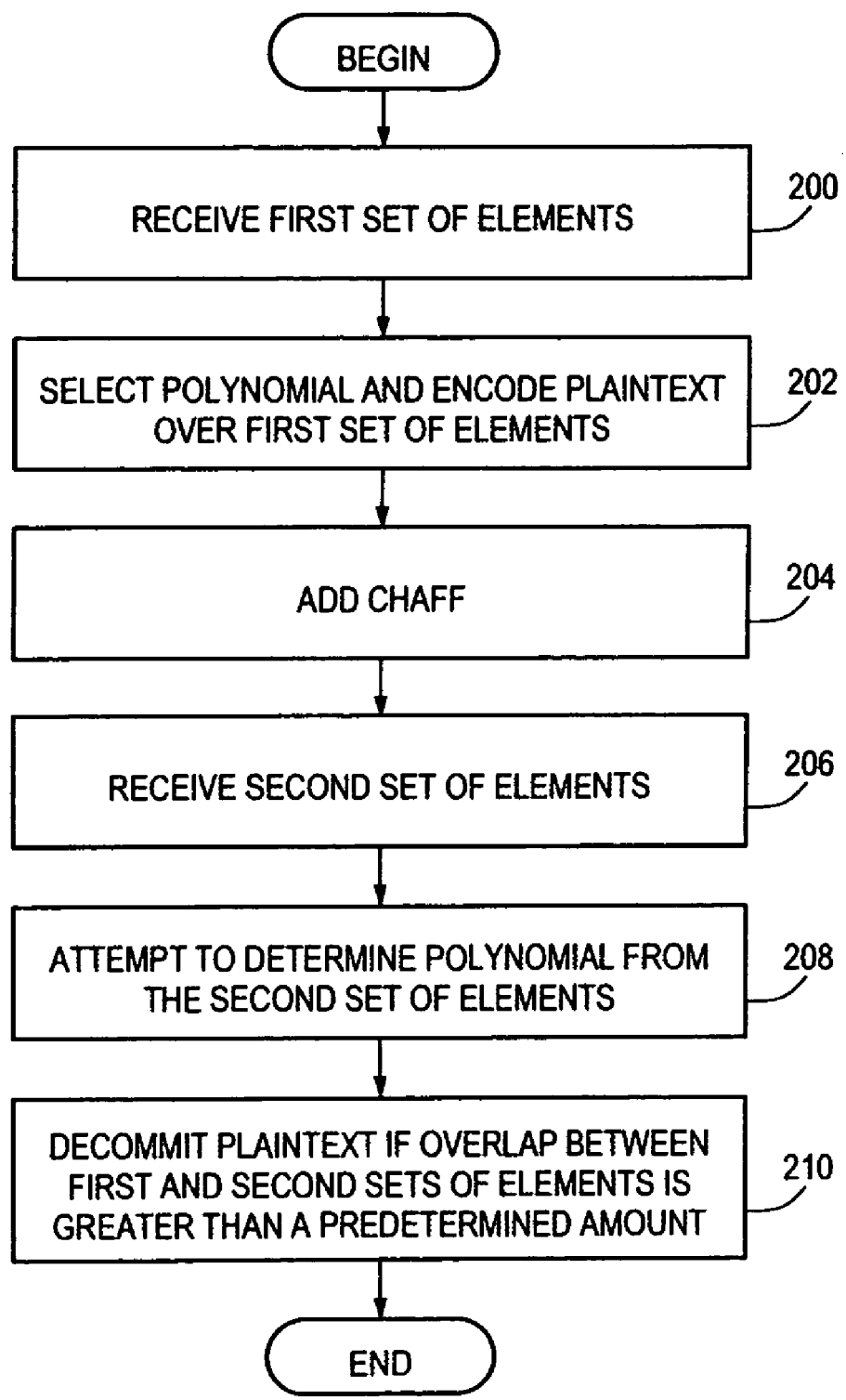
FIG. 4 is a flow diagram showing an exemplary sequence of steps for implementing an order-invariant fuzzy commitment system in accordance with the present invention.

FIG. 4 shows an exemplary sequence of steps for implementing an order-invariant fuzzy commitment scheme in accordance with the present invention. In step 200, a first set of elements E selected from a larger set of elements, e.g., a field F, is received. A polynomial p defined by the elements in the first set E is selected for encoding a plaintext in step 202. Chaff is then added to a target set in step 204 to hide the first set in the target set. In step 206, a second set of elements D is received, such as from a second user wishing to discover the encoded plaintext. The second set is used in an attempt to determine the polynomial defined by the first set in step 208. If the level of overlap between the first and second sets is greater than a threshold $\epsilon$, then the polynomial p can be discovered and the plaintext can be decommitted by the second user D in step 210.

In another aspect of the invention, the system can utilize decodable designs. As used herein, decodable designs refer to designs having a relatively low level of overlap between pairs of constituent sets. For a finite universe U and integers t and $\Delta$, a design of cardinality t over universe U is denoted as $D_{t,U,\Delta}$, where $\Delta$ defines a maximum level of overlap between constituent sets. A design $D_{t,U,\Delta}$ corresponds to a collection of m sets, i.e., $\{S_1, S_2, S_m\}$, in the universe U for arbitrary m, each with cardinality t. A decodable design is a design having low overlap between pairs of constituent sets, e.g., $\Delta \geq |S_i \cap S_j|$ for some $\Delta < t$.

Let S be a set of cardinality t representing a small perturbation of some $S_i \in D_{t,U,\Delta}$, i.e., the result of introducing a small number of errors into $S_i$. Loosely speaking, a decodable design can be considered to be a design in which, given such a set S, it is possible to determine $S_i$ in an efficient fashion. Let S–S' denote the set of elements in S that are not in S'. More formally, a (|U|, t, $\epsilon$)-decodable design comprises a design $D_{t,U,\Delta}$ and an algorithm M with running time polynomial in t such that for any $S_i \in D_{t,U,\Delta}$ and $S' \in U^t$, where $\epsilon \geq |S_i-S'|$ it is the case that M(S')=$S_i$.

In an exemplary embodiment, an error-correcting code can be used to provide an order-invariant fuzzy commitment in accordance with the present invention. The elements in the code are sets rather than sequences of information symbols. It is understood, however, that a set $S \in U^t$ can be encoded as a bit vector of length U and weight t, where a given bit indicates the presence or absence in S of a given element from U. This converts a set representation into a sequence representation. The resulting encoding and decoding algorithms, however, rely upon binary representations, and also have running time proportional to |U|, which may be relatively large with respect to t. In general, it is desirable to achieve a decodable design having algorithms that run efficiently in t.

In one embodiment, relatively efficient decodable designs can be provided using error correcting codes. Let C be a set of codewords over a field F, and let $c_1^{(j)}, c_2^{(j)}, \ldots c_n^{(j)}$ denote the sequence of information symbols that make up codeword $c^{(j)} \in C$, for n<=q, where n denotes the number of information symbols and q denotes the number of elements in the field. Let m=|C|, and let $S_j = \{(i, c_i^{(j)})\}_{i=1}^n$. This is a decodable design $D_{n, Zn \times F, n-d}$, where Z is the set of integers and $Z_n$ is the set of integers modulo n, and d is the minimum distance of the code C. The decoding algorithm M can be derived in a conventional manner from the underlying error correcting code such that $\epsilon = \lceil d \rceil / 2 - 1$. Thus, $D_{n, Zn \times F, n-d}$, is an (nq, t, $\epsilon$)-decodable design. It is understood that a decodable design can be created over any universe U given a bijection from U to $Z_n$. As is known to one of ordinary skill in the art, a bijection is a one-to-one and onto function.

In an alternative embodiment, a method of constructing a decodable design based upon an error correcting code includes "hiding" a set in the design. In this embodiment, the universe U should have a poly-time mapping $\phi: U \to Z_n$. This arrangement can be useful from a cryptographic standpoint since it allows for any set S to be "hidden" in the design with relative ease, as discussed below.

Let C be the set of codewords over field F for some (n, k, d) error correcting code, where n refers to the total number of symbols, k refers to the number of information symbols, and d refers to the minimum distance of the code. As set forth above, let $c^{(j)} = c_1^{(j)} c_2^{(j)} \ldots c_n^{(j)}$ be the jth codeword in C. Let $R = \{(x_1, y_1), (x_2, y_2), \ldots, (x_r, y_r)\}$ be a sequence of r distinct elements from mapping $Z_n \times F$, such that r>t. The set R is referred to as the target set for the decodable design $D_{t,U,\Delta}$.

Consider a set $S = \{s_1, s_2 \ldots, s_t\} \in U^t$. A projection $\Phi$ of this set S onto the target set R can be defined as follows. Let $\Phi: U^t \times F^r \to (Z_n \times F)^t$ be defined such that an element $(x_i, y_i) \in \Phi(S, R)$ if and only if (iff), for some set element $s_j \in S$, $\phi(s_j) = x_i$. In other words, the projection $\Phi$ refers to a selection of elements "picked out" or indexed by S in the target set R.

The decodable design $D_{t,U,\Delta}$ comprises sets S whose projections onto set R specify codewords in C. Thus, a set is an element of the design, i.e., $S \in D_{t,U,\Delta}$, if for some codeword $c^{(j)} \in C$ and all the elements are picked out by the projection $(x_i, y_i) \in \Phi(S, R)$, there is a codeword such that $c_{x_i}^{(j)} = y_i$.

Thus, for example, if C is an (n, k, d)-Reed-Solomon code, a set S lies in the design $D_{t,U,\Delta}$, if it "picks out" t points all of which lie on some unique polynomial of degree k−1 over F.

As is well known to one of ordinary skill in the art, Reed-Solomon codes are block-based error-correcting codes. A Reed-Solomon encoder takes a block of data and adds redundancy symbols that can be used to correct errors in the received data. The code is typically specified as RS(n,k) in which the encoder takes k symbols and adds redundant symbols to generate an n-symbol codeword. Using standard methods such as the Peterson-Berelekamp-Massey algorithm, a decoder can correct up to s symbols that contain errors in a codeword such that 2s=n−k. Other non-standard algorithms, such as that of Guruswami and Sudan, are capable of correcting more errors, but are typically less efficient.

EXAMPLE 1

Consider a small Reed-Solomon code over a field F such that |F|=7. The elements of the field F can be denoted by the integers 0, 1, . . . 6. A (7,3,5) Reed Solomon code can be selected in which a codeword comprises the sequence p(0)p(1)p(2) . . . p(6) for a polynomial p of degree at most 2 over F. Now considering the construction of a decodable design $D_{t,U,\Delta}$, where U={ 1, 2, . . . 6}, φ is the identity mapping, and t=4, the design $D_{t,U,\Delta}$, can be specified in terms of the target set R={(1,6), (2,1), (3,0), (4,3), (5,3), (6,0)}.

Consider the set $S \in U^t$ in which S={1, 2, 3, 4}. The projection $\Phi(S,R)$={(1, 6), (2,1), (3,0), (4, 3)}. Thus, the set is an element of the design, i.e., $S \in D_{t,U,\Delta}$, if there is a polynomial p in the code such that p(1)=6, p(2)=1, p(3)=0, and p(4)=3. It is readily apparent from Lagrange interpolation that $p(x)=2x^2+3x+1$ meets this requirement, and thus $S \in D_{t,U,\Delta}$. LaGrange interpolation is well known to one of ordinary skill in the art.

Now consider a further set S'={2, 3, 4, 5}. The projection $\Phi(S',R)$={(2, 1), (3,0), (4,3), (5,4)}. Thus the set is an element of the design, i.e., $S' \in D_{t,U,\Delta}$, if there is a polynomial p such that p(2)=1, p(3)=0, p(4)=3, and p(5)=4. Since k=3, because polynomials of degree at most 2 are used, it can be seen that the only polynomial fitting the first three of these points is, again, $p(x)=2x^2+3x+1$. However, p(5)=3≠4. Therefore S' is not an element of the design, i.e., $S' \notin D_{t,U,\Delta}$.

In the exemplary embodiments described herein, situations in which an element S is planted in a design are particular interest. This can be achieved by selecting a codeword $c^{(j)} \in C$ and setting the appropriate elements in the target set R so that the projection $\Phi(S,R)$ specifies $c^{(j)}$. This fixes t elements in R. The remaining r−t elements can be selected at random. Provided that the commitment size r is large relative to the cardinality of F, it is expected that there are many different codewords represented by t elements in the resulting target set R. In consequence, the codeword $c^{(j)}$ will be "hidden". That is, an attacker will not know which of the many possible codewords was explicitly embedded in the target set R. Likewise, the set S can be considered to be "hidden" in the resulting design $D_{t,U,\Delta}$ since the design $D_{t,U,\Delta}$ itself contains many random elements.

While the invention is primarily shown and described in conjunction with a Reed-Solomon error-correcting code, it is understood that a variety of suitable error-correcting codes known to one of ordinary skill in the art can be used. In addition, it is understood that the inventive order-invariant scheme is applicable to uniform and non-uniform distributions.

An exemplary encryption algorithm ENC using a Reed-Solomon code with n=q is now described. Since a Reed-Solomon code forms the basis for the algorithm, a codeword consists of a polynomial p. The polynomial p is selected to be of degree at most k−1 and constructed it in such a way that it encodes the plaintext κ. A bijection ξ can be used to map between plaintext κ and polynomials. Since $κ \in F^k$, this can be achieved in a well known manner by setting the coefficients of p to the information symbols in the plaintext κ. The encryption algorithm ENC hides p under the secret key E.

The encryption algorithm ENC is based on a decodable design, as described above. A decodable design $D_{t,U,\Delta}$ is constructed such that the set E is hidden in the design $D_{t,U,\Delta}$ and the polynomial p is hidden in the target set R. More particularly, as described above, the target set R is constructed so that the projection $\Phi(E,R)$ specifies p by fixing t elements of R. To complete the hiding, as above, the remaining r−t elements are filled out at random with chaff points drawn from F. In one particular embodiment, the chaff points $(x_i, y_i)$ are selected as follows: $x_i$ is any point distinct from the previously chosen points, and $y_i$ is any value in $F-p(x_i)$. Thus, the chaff points do not lie on the polynomial p, and thereby aid in concealing it.

Let $P_{k-1,F}$ be the set of polynomials of degree at most k−1 over F. Assuming below that all mappings are efficiently computable, an exemplary algorithm in accordance with the present invention is set forth below:

Public parameters: A universe U, a field F, mappings φ: $U \to Z_q$, ρ: $U \to F$, and bijection ξ: $F^k \leftrightarrows P_{k-1,F}$ Input: Parameter set (k, t, r) such that q≧r≧t≧k, an encryption list of distinct elements $E=\{e_1, e_2, \ldots, e_t\} \in U^t$ and a plaintext $κ \in F^k$.

Output: A target set $R=\{(x_i, y_i)\}_{i=1}^r$ where $x_i \in Z_q$ and $y_i \in F$ for 1≦i≦r.

This specifies a decodable design $D_{t,U,\Delta}$.

Algorithm ENC p←ξ(κ)
For i=1 to t
   $(x_i, y_i) \leftarrow (\phi(e_i), p(\rho(e_i)))$;
For i=t+1 to r do
   Select $x_i \in_U Z_n - \{x_j\}_{j=1}^{i-1}$;
   Select $y_i \in_U F - \{p(x_i)\}$;
Select $\pi \in_U \Pi_r$;
Permute $\{(x_i, y_i)\}_{i=1}^r$ according to π;
Output $\{(x_i, y_i)\}_{i=1}^r$ where, $\Pi_r$ represents the symmetric group, i.e., the set of all permutations, on r elements.

The first loop in the encryption algorithm ENC effects the embedding of E and p in the decodable design. That is, this loop creates points in the target set R such that $\Phi(E,R)$ specifies p. The second loop adds random chaff points to the target set R. In the final part of the algorithm, a random permutation is applied in order to conceal "correct" points lying on p from the chaff points.

An exemplary decryption algorithm RSdecode in accordance with the present invention is now described. A Reed-Solomon error-correcting code is used. The decoding algorithm RSdecode takes as input a collection of points that are presumed to lie preponderantly on a single polynomial of a predetermined degree at most k−1. The RSdecode algorithm, if successful, outputs a polynomial p intersecting a large majority of the input points. (It is understood that a host of candidate polynomials can also be provided as an output.) Otherwise, the algorithm outputs 'nil'. The 'nil' output can occur, for instance, if no polynomial of the right degree matches the inputs adequately, or if computation of such a polynomial is too "hard." Exemplary parameters for an implementation of the RSdecode algorithm is set forth below in pseudo-code:

Public parameters: A field F and a mapping $\rho: Z_q \to F$

Input: A degree parameter $k \leq q$ and a list of points $Q = \{(x_i, y_i)\}_{i=1}^z$ such that $x_i \in Z_q$ and $y_i \in F$ for $1 \leq i \leq z$, where $z \leq q$.

Output: A polynomial $p \in P_{k-1, F}$ or else 'nil'. RSdecode(k, Q) denotes the output on inputs k and Q.

In an exemplary embodiment, the choice for the decode algorithm RSdecode is the well-known algorithm of Peterson-Berlekamp-Massey. This algorithm decodes successfully if at least $(k+z)/2$ points in Q share a common polynomial, where k and z are defined by the pseudocode. Another choice for RSdecode, which may recover p successfully, is known as Guruswami and Sudan algorithm. This algorithm successfully determines p provided that the number of points in Q that lie on p is at least the square root of kz.

The Peterson-Berlekamp-Massey is currently the preferred embodiment, based upon the fact that this algorithm is, in general, more efficient than the Guruswami-Sudan algorithm, and has the advantage of being well studied and widely implemented. Moreover, for many of the parameter choices likely to be encountered in practice, $(k+z)/2$ is fairly close to the square root of kz. It is understood, however, that further algorithms, known and not yet known, can be used without departing from the present invention.

Given the availability of RSdecode above, the decommitment algorithm DEC is relatively straightforward, as shown below. The set D is projected onto the target set R. If D is close to E, this yields the original polynomial p, and thus the corresponding plaintext κ.

Public parameters: A universe U, a field F, mappings $\phi: U \to Z_q$, $\rho: U \to F$, and bijection $\xi: F^k \hookrightarrow P_{k-1, F}$ Input: Parameters (k, t, r), a target set $R \in Z_q \times F$ specifying a decodable design $D_{t,U,\Delta}$ and a decryption key (i.e., set) $D \in U^t$.

Output: A plaintext $\kappa' \in F^k$, or else 'nil' if unsuccessful.

$Q \leftarrow \Phi(R,D)$
$p = \text{RSdecode}(k,Q)$
If p='nil'
   Output 'nil';
Else
   Output $\xi^{-1}(p)$;

The completeness of the commitment scheme is as follows. Given use of the Peterson-Berlekamp-Massey algorithm for RSdecode, the algorithm pair (ENC, DEC) above with parameter set (k, t, r) is complete with $(t-k)/2$ fuzziness.

EXAMPLE 2

Consider the movie lover's problem with a total list of $10^4$ titles in which the sender selects a list E of $t=22$ different favorites. A value of $k=14$ can be selected. Since $(k+t)/2=18$, another movie lover with a list D of 22 movie titles will be able to decrypt the digital box via the well-known Peterson-Berlekamp-Massey algorithm provided that the original list E and the new list D intersect on at least 18 titles.

Note that for this choice of parameters, it is feasible to compute all possible subsets of size 18 from the set of size 22, and try interpolating from each subset. This would result, however, in an average of 3657.5 trials, while one decoding step is easily within an order of magnitude of one interpolation step. Thus, the use of RSdecode speeds up the decommitment step by at least a factor of 300.

Security can be formalized, and in particular the soundness of the algorithmic pair (ENC, DEC), in an information-theoretic sense. Assume that the first set E is selected according to some potentially non-uniform distribution d. The ability of an attacker with unlimited computational power to determine n from $ENC(E, \kappa)$ can be characterized as follows. Assume that this attacker is given knowledge of a uniformly random δ-fraction of E, i.e., a random subset E' of at most δt elements in E (where it is assumed δt is an integer). The assumption that the adversary has knowledge of part of the secret key E may be slightly unorthodox. However, in a "fuzzy" system it is natural to consider such notions of partial adversarial knowledge, as highlighted in the examples set forth herein. Of course, a variety of other security assumptions will be readily apparent to one of ordinary skill in the art.

The security can be characterized in terms of the following experiment with an unbounded adversary A for a given parameter set. The adversary A takes as input a list of δt elements of E, the parameters t and k, and a ciphertext Y, and outputs a guess at κ. Formally, A is an algorithm A: $U^{\delta t} \times Z^2 \times F^r \to F^k$ with no bound on computational complexity. Let $\in_d$ denote selection from probability distribution d, and $\in_U$ denote uniform random selection. Assuming that κ is generated uniformly at random, as κ is typically used as a key for some independent ciphertext. Let $\{E\}_i$ denote the set of subsets of E of cardinality i. The experiment can be expressed as set forth below.

Experiment Attack(ENC, A)
$\kappa \in_U F^k; E \in_d U^t; E' \in_U \{E\}_{\delta t}$
if $A(E', t, k, ENC(E, \kappa))=\kappa$
   Output '1';
Else
   Output '0';

Thus, an encryption/decryption pair (ENC, DEC) is information theoretically sound with parameter pair (δ,μ) if pr[Attack (ENC, A)=1]≤μ for any unbounded adversary A.

Let d' be the probability distribution d restricted to sets E such that $E' \subset E$. Observe that given ciphertext Y, the best strategy an (unbounded) adversary can adopt is to output a plaintext κ', such that the function w where $w(\kappa', Y)=pr_{E \in d'U_t}[ENC(E, \kappa')=Y]$ is maximized. For a given ciphertext $Y=ENC(E, \kappa)$, the probability of success of this strategy is seen to be $w(\kappa,Y)/\Sigma_{\kappa' \in F}^k w(\kappa',Y)$. Let $pr_d(E)$ denote the weight of E in probability distribution d. Thus, an encryption/decryption pair (ENC, DEC) is information theoretically sound with parameter pair (δ,μ) if $$\mu \geq \sum_{\kappa \in F^k, E \in U^t} pr_d(E) \frac{w(\kappa, ENC(E, \kappa))}{\sum_{\kappa' \in F^k} w(\kappa', ENC(E, \kappa))}$$

Similarly, an encryption/decryption pair (ENC, DEC) is computationally sound with parameter pair (δ,μ) if pr[Attack (ENC, A)=1]≤μ for any adversary A that runs in time polynomial in t.

It is understood that the security of the order-invariant fuzzy commitment scheme depends upon the number of chaff points (r−t) in the target set R. The greater the number of such points, the more "noise" there is to conceal p from an attacker. The difference between embodiments with computational security and embodiments with information-theoretic security is the number of chaff points. If the objective is computational security, the system can insert fewer points than if information-theoretic security is required. The underlying encryption and decryption algorithms can remain the same in either case.

As described above, one effective polynomial-time algorithm RSdecode for solving the Reed-Solomon problem is known as the Guruswami and Sudan algorithm. Let z' be the maximum number of points in Q on which any polynomial agrees. They demonstrate that such an algorithm is successful in the case where z'≧squareroot(kz). This result provides an upper bound on the hardness of the Reed-Solomon decoding problem, but no corresponding lower bound. A lower bound on problem the problem can be characterized by hypothesizing a constant c>1 that satisfies the following assumption: there is no general polynomial-time algorithm RSdecode that outputs p with non-negligible probability if z'≧squareroot (kz), provided that z>q/c.

This assumption is based on the conjunction of two beliefs. The first is that the Reed-Solomon decoding problem is information theoretically hard when the chaff points are chosen carefully. Specifically, it is believed that there exists a choice of data points Q such that exponentially many polynomials agree with Q in squareroot(kz)/c points. (Of course, no such examples have been found or shown to exist.) The second belief is that if the decoding problem is information theoretically hard for a worst-case choice of the input, then it is computationally hard for a randomly chosen input also. That is, the problem remains hard, though only computationally, even when Q is chosen at random. Finally, the condition z>q/c is motivated by an information-theoretic proof of security (for weaker choices of parameters), which demonstrates the presence of many candidate polynomials when a number of chaff points is included; even a relatively small number of chaff points still introduces many polynomials that are close to agreement on squareroot(kz)/c points. A constant c=2 is believed likely to be a safe choice of parameter for the hardness assumption, although smaller values of c may well be sufficient to render the decoding problem intractable. It is further believed that the c-hardness assumption, while asymptotic, holds in practice for parameter values large enough to resist brute-force attacks.

Given the c-hardness assumption, it can be seen that if E and p are generated uniformly at random, the above-described construction is secure in an asymptotic sense provided that r>q/c, and thus that at least q/c−t chaff points are inserted into the target set R.

As discussed above, simply by inserting a large enough number of chaff points into the target set R, an information-theoretic guarantee of security can be achieved since many polynomials agree with the target set R in t places. Recall that the encryption algorithm ENC picks t points according to a given polynomial p of degree less than k and r−t random points $(x_i, y_i)$ in $Z_q \times F$ and outputs this set in random order as a commitment to p. Recall that q denotes the cardinality of the field F. Thus, for every μ>0, with probability at least 1−μ, the target set R generated by the algorithm ENC on polynomial p and encryption set E satisfies the following condition: There exist at least $(\mu/3)q^{k-t}(r/t)^t$ polynomials $p' \in P_{k-1,F}$ such that R includes exactly t points of the form $(x, p'(x)) \in Z_q \times F$.

EXAMPLE 3

Consider the following choice of parameters. Suppose we pick a field of size approximately $q=10^4$, and set r=q. Now let t=22, i.e., the movie lovers pick twenty-two of their favorite movies out of a choice of q, and chaff the data with q−22 random points. Use this information to encrypt a polynomial of degree less than 14 (as in the earlier example). Then it is expected that about $10^{26}$ polynomials of degree less than 14 agree with 22 out of the roughly $10^4$ points in R. In particular, with probability at least $1-10^{-13}$, there will be $10^{13}$ polynomials exhibiting this behavior. (Thus, what may be roughly characterized as a 43-bit security level can be achieved.)

However, this example may suffer a loss in security due to a naive transformation of expected values to high probability results. It is believed that a realistic level of security is with a probability of at least $1-10^{-25}$, there are $10^{25}$ polynomials agreeing with the given data on 22 points, which is about 83-bit security.

EXAMPLE 4

Again, select $r=q \approx 10^4$ and t=22. This time the information is used to encrypt a polynomial of degree less than 18. The decommitment works correctly with 20 agreements, and the running time is faster than a brute-force search by a factor of at least 10. It then expected that about $10^{42}$ polynomials of degree less than 18 agree with 22 out of the approximately $10^4$ points in Q. In particular, with probability at least $1-10^{-21}$, there will be $10^{21}$ polynomials exhibiting this behavior. Thus, what may be roughly characterized as a 70-bit security level is achieved.

For every μ>0, with probability at least 1-μ, the target set R generated by the algorithm ENC to commit to a polynomial p with encryption set E satisfies the following condition: There exist at least $(\mu/3)q^{k-t}|\epsilon|$ polynomials, $p' \in P$ such that R agrees with p' on some subset of t points in the family ε.

EXAMPLE 5

Consider a variant of the movie lover's problem where the movie lover is expected to choose 2 movies each from 10 categories, and each category consists of 1000 movies. In this case, the distribution on movies has support on only $$\left( \binom{10^3}{2} \right)^{10}$$

sets. With $r=10^4$, t=20 and k=16, it is expected to find $10^{32}$ polynomials of degree at most 15 agreeing with the data on 20 points, with 2 agreements each from each of 10 categories. This can be converted to the following probability statement: With probability at least $1-10^{-16}$ there exist $10^{16}$ polynomials of degree at most 15 that agree with the given data points on two points each in each of the 10 categories. Thus, about a 53-bit security level is achieved.

In a further aspect of the invention, a biometric system includes an order-invariant fuzzy commitment scheme based upon biometric information. With this arrangement, it is possible to verify whether or not a fingerprint presented during an authentication session is similar to—and thus likely to belong to the same user as—one presented during an enrollment session. The biometric system authenticates the user if the enrolled image and the current image overlap by a predetermined amount, resulting in a successful decommitment.

Figure 5:
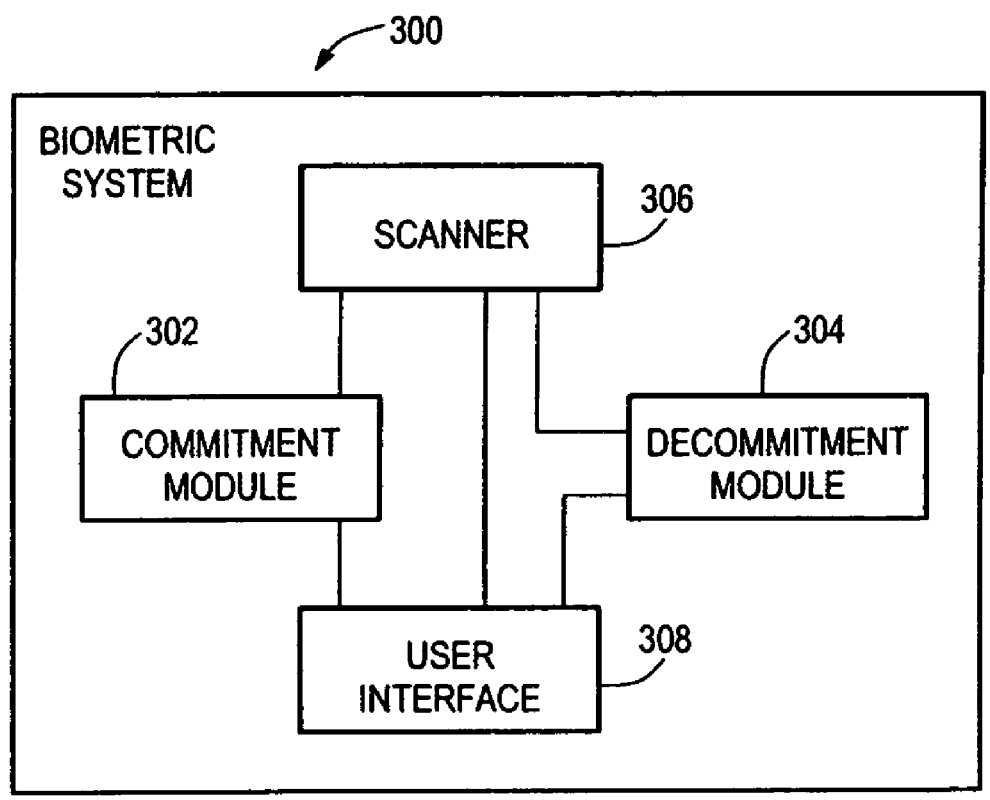
FIG. 5 is a schematic depiction of a biometric system having an order-invariant fuzzy commitment scheme in accordance with the present invention.

FIG. 5 shows an exemplary biometric system 300 having order-invariant fuzzy commitment of biometric information in accordance with the present invention. The system 300 includes a commitment module 302 and a decommitment module 304. A scanner 306 obtains biometric information from users that desire to be authenticated by the system. Users can interact with the system 300 via a user interface 308, which can be provided as a graphical user interface.

In general, the system 300 provides order-invariant fuzzy commitment of keys so as to obviate the need for explicit biometric template storage. That is, the inventive biometric system requires successful decommitment of a key previously committed under biometric information. The decommitted key can be used for user authentication. It is understood that key commitment information can be stored in a variety of devices types and locations, such as on a server.

For example, Alice can commit a key (or PIN)k_{Alice} under her fingerprint, resulting in fuzzy commitment R. If Alice can decommit R using her fingerprint, she can recover k_{Alice} and authenticate herself successfully. To do this, she only needs R and her finger.

As is well known to one of ordinary skill in that art, a variety of biometric information types can be used for authentication. Exemplary biometrics include fingerprint information, retinal scan information, iris scan information, bloodflow-pattern information, thermal imaging information, handwritten-signature dynamics information, physiognomic information, hand geometry information, and voice information.

In one particular embodiment, the system 300 commits a key under fingerprint information. As is well known to one of ordinary skill in the art, each fingerprint image includes a series of characteristics that can be used to identify the fingerprint uniquely. For example, fingerprints contain ridges in the form of concentric raised images in patterns, such as loop, arch, and whorl patterns. Global features are visible to the naked eye while local features are not. Additional characteristics include pattern area, core point, delta, type lines, and ridge count. The ridges are not continuous, but break, fork, and change direction. The points at which ridges change or terminate are referred to as minutia points, which provide unique identifying information. Minutia points can include ridge endings, ridge bifurcations, ridge divergences, dots and islands, enclosures, and short ridges.

Conventional fingerprint authentication systems use minutia points in a variety of ways to uniquely identify fingerprints. One such system is described in U.S. Pat. No. 6,314,196, which is incorporated herein by reference.

In an exemplary embodiment, the user provides a fingerprint via the scanner 306 in an enrollment session. A set of features $E=f_1 \ldots f_v$ is derived therefrom. The features can be provided as a wide variety of fingerprint characteristics, as described above. In one embodiment, each feature corresponds to a count of the number of ridges between a pair of minutia points or variant thereof In this embodiment, an exemplary range for the number of features is from about 225 and 10,000 features.

A random key kappa is generated and a commitment R is generated of kappa under the set of features E by the commitment module 302. The key kappa is stored on the server and the commitment R is held by the user or else provided to the user by the server or some other storage-capable device. After requesting authentication, the user presents a fingerprint to a scanner 306 for generating a feature set D. This set D is used in an attempt to decommit R via the decommitment module 304. If successful, the user obtains kappa and authenticates herself successfully to the server.

In one particular embodiment, after processing the minutia points to form the fingerprint set for the user, the controller 302 selects a polynomial, for example as described in detail above, based upon the fingerprint set elements. The number of fingerprint elements can range from about 10 to about 2000. Exemplary polynomials range in degree from about 10 to about 2000. Chaff points, which can be random points, can be inserted into the fingerprint set to form a target set, as described in detail above. A user key can be committed under the fingerprint set by the commitment module 30, as described in detail above, to form an order-invariant fuzzy commitment R.

It is understood that each symbol in the first input set E or second input set D may occur more than once, i.e., a set with multiple instances of the same value, e.g., { 1, 1, 1, 2, 2, 3, 4, 5, 5, 5} or multiset. In addition to pairs, further embodiments can have sets that include triples, tuples, etc. For example, a set can be of the form $(x_i, w_i)$, where $w_i$ describes the number of occurrences of $x_i$ in the set E. Thus, to decommit correctly, a user must know not only which symbols are correct, but also have at least approximate knowledge of how many instances of each lie in the multiset E. Alternatively, $w_i$ can be an integer or real-valued weighting of the value $x_i$ in the set, for example a weighting associated with the feature $f_i$ derived from the processing of the fingerprint image. Thus, to decommit correctly, a user must know not only which symbols are correct, but also have at least approximate knowledge of the integer or real-valued weightings associated with these symbols.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A computer-implemented method for creating an order-invariant fuzzy commitment, comprising:
    (a) receiving a first input element comprising a sequence of at least one value $(a_1, \ldots, a_n)$ from a predetermined set;
    (b) generating a codeword of an error-correcting code for generating the commitment;
    (c) constructing a first sequence of coordinate sets $(x_i, y_i)$, for i in $\{1, \ldots n\}$, each of the coordinate sets having a first value $(x_i)$ corresponding to a representation of an associated one $(a_i)$ of the at least one value of the first input element and a second value $(y_i)$ corresponding to a symbol in the codeword, wherein the symbol corresponds to the $x_i$th symbol in the codeword, wherein an order-invariant fuzzy commitment is formed, the commitment having the property that it may be algorithmically combined with at least one set of values comprising at least one value of the first input element so as to yield the codeword;
    reordering the first sequence based upon the first value;
    outputting the first sequence; and
    utilizing the first sequence, in response to receiving a second input element from a user, to authenticate the user to a secured system associated with the first sequence.

2. The method according to claim 1, wherein the representation of the first value in the first sequence of coordinate set is an integer representation.

3. The method according to claim 1, further including deriving the first input element from a measurement of a biometric associated with a user.

4. The method according to claim 3, further including selecting the biometric from the group consisting of fingerprint information, retinal scan information, iris scan information, bloodflow-pattern information, thermal imaging information, handwritten-signature dynamics information, physiognomic information, hand geometry information, and voice information.

5. The method according to claim 1, further including adding chaff to the first sequence.

6. The method according to claim 5, further including adding the chaff as sets of pairs of the form (x,y) such that x does not lie in the input sequence and y is generated at random.

7. The method according to claim 5, further including adding the chaff as sets of pairs of the form (x,y) such that one or more values x do lie in the input sequence and y is generated at random.

8. A computer-implemented method for creating an order-invariant fuzzy commitment, comprising:
(a) receiving a first input element comprising a sequence of at least one value $(a_1, \ldots, a_n)$ from a predetermined set;
(b) generating a codeword of an error-correcting code for generating the commitment;
(c) constructing a first sequence of coordinate sets $(x_i, y_i)$, for i in $\{1, \ldots n\}$, each of the coordinate sets having a first value $(x_i)$ corresponding to a representation of an associated one $(a_i)$ of the at least one value of the first input element and a second value $(y_i)$ corresponding to a symbol in the codeword, wherein the symbol corresponds to the $x_i$th symbol in the codeword, wherein an order-invariant fuzzy commitment is formed, the commitment having the property that it may be algorithmically combined with at least one set of values comprising at least one value of the first input element so as to yield the codeword;
adding the chaff as sets of pairs of the form (x,y) such that x does not lie in the input sequence and y is generated at random; and
reordering the first sequence based upon the first value;
outputting the first sequence; and
utilizing the first sequence, in response to receiving a second input element from a user, to authenticate the user to a secured system associated with the first sequence.

9. The method according to claim 8, further including reordering the first sequence in ascending order based upon the first value.

10. The method according to claim 1, further including applying a bijective function to an input secret to obtain the codeword for the symbol corresponding to the second value.

11. The method according to claim 1, further including decommitting the order-invariant commitment by
receiving a second input element including a second sequence of at least one value $(b_1, \ldots b_m)$ from the predetermined set;
receiving the first sequence;
constructing a derived set of values $(X'=x_1', \ldots, x_m')$ representing respectively the at least one value $(b_1, \ldots, b_m)$ in the second sequence;
selecting a subset of the coordinate sets $\{(x_i, y_i)\}$ in the first sequence (E) such that for each pair (x',y') in the subset, the first value in the pair (x') lies in the derived set of values (X'); and
applying an error-correcting function to the subset.

12. The method according to claim 11, wherein the error-correcting function includes a Reed-Solomon code.

13. The method according to claim 1, further including selecting a polynomial to generate the codeword.

14. The method according to claim 1, further including utilizing a decodable design for decommitting the order-invariant commitment.

15. A computer-implemented method for creating a reordering-tolerant fuzzy commitment comprising:
(a) receiving a first input element A including a first sequence of at least one value;
generating a first codeword c of an error-correcting code for the commitment;
(c) constructing a sequence E of one or more data elements responsive to the first input element A and the first code word c of the error-correcting code;
outputting the sequence E;
(e) receiving a second input element B including a second sequence of at least one value and the sequence E, wherein the second sequence has a number of elements m;
(f) applying a function d responsive to the second input element B and the sequence E, wherein the function yields as output a value of a second codeword (c'd(B,E)), the function having a property such that d(V,E)=c for at least one possible value of V, where V comprises a third sequence having a number of elements $m_v$, wherein the at least one value of the first sequence differs from the at least one value of the third sequence in at least $m_v/2$ values;
(g) outputting the second codeword (c'd(B,E)); and
(h) utilizing the second codeword (c'd(B,E), in response to receiving a second input element from a user, to authenticate the user to a secured system associated with the first sequence.

16. A computer-implemented method for creating an order-invariant fuzzy commitment, comprising:
(a) receiving a first input element (A) comprising a sequence of at least one value $(a_1, \ldots, a_n)$ from a predetermined set (F);
(b) generating a codeword (c) of an error-correcting code for generating the commitment;
(c) constructing a first sequence (E) of coordinate sets $(x_i, y_i)$ for i in $\{1, \ldots k\}$ for integer k >0, each of the coordinate sets having a first value $(x_i)$ corresponding to a representation of an associated one $(a_i)$ of the at least one value of the first input element (A) and a second value $(y_i)$ corresponding to a symbol in the codeword (c), wherein the symbol is selected in a manner responsive to the first value $x_i$, wherein an order-invariant fuzzy commitment is formed;
reordering the first sequence based upon the first value;
outputting the first sequence; and
utilizing the first sequence, in response to receiving a second input element from a user, to authenticate the user to a secured system associated with the first sequence.

17. A computer-implemented method for creating an order-invariant fuzzy commitment, comprising:
(a) receiving a first input element (A) comprising a sequence of at least one value $(a_1, \ldots, a_n)$ from a predetermined set (F);
(b) generating a codeword (c) of an error-correcting code for generating the commitment;
(c) constructing a first sequence (E) of coordinate sets $(x_i, z_i, y_i)$, for i in $\{1, \ldots, k\}$> each of the coordinate sets having a first value $(x_i)$ corresponding to a representation of an associated one $(a_i)$ of the at least one value of the first input element (A) and a second value $(z_i)$ constructed in a manner responsive to a pattern of occurrence of the associated one $(a_i)$ of the at least one value of the first input element (A) in the sequence $(a_i, \ldots, a_n)$ and a third value $(y_i)$ corresponding to a subset of symbols in the codeword (c), wherein the subset of symbols is selected in a manner responsive to at least one of the first and second values of the coordinate set ($x_i$ and $z_i$), wherein an order-invariant fuzzy commitment is formed;

(d) outputting the first sequence; and
(e) utilizing the first sequence, in response to receiving a second input element from a user, to authenticate the user to a secured system associated with the first sequence.

18. A method according to claim 17, further including decommitting the order-invariant commitment by
   receiving a second input element B including a second sequence of at least one value $(b_1, \ldots, b_m)$ from the predetermined set (F);
   receiving the first sequence (E);
   constructing a derived set of values $(X'=x1', \ldots, x_m')$ representing respectively the at least one value $(b_1, \ldots, b_m)$ in the second sequence (B);
   selecting a subset (E') of the coordinate sets $\{(x_i, y_i)\}$ in the first sequence (E) such that for each pair (x',z',y') in the subset (E'), the first value in the pair (x') lies in the derived set of values (X'); and
   applying an error-correcting function to the subset (E').

19. A computer-implemented method for creating an order-invariant fuzzy commitment, comprising:
   (a) receiving a first input element (A) comprising a sequence of at least one value $(a_1, \ldots, a_n)$ from a predetermined set;
   (b) generating a codeword (c) of an error-correcting code for generating the commitment;
   (c) constructing a first sequence (E) of coordinate sets $(x_i,z_i,y_i)$, for i in $\{1, \ldots, k\}$ for integer k>0, each of the coordinate sets having a first value $(x_i)$ corresponding to a representation of an associated one $(a_i)$ of the at least one value of the first input element (A) and a second value $(z_i)$ constructed in a manner responsive to information in the first input element (A), and a third value $(y_i)$ corresponding to a subset of symbols in the codeword (c), wherein the subset of symbols i selected in a manner responsive to at least one of the first and second values $(x_i$ and $z_i)$ of the coordinate set, wherein an order-invariant fuzzy commitment is formed;
   (d) outputting the first sequence; and
   (e) utilizing the first sequence, in response to receiving a second input element from a user, to authenticate the user to a secured system associated with the first sequence.

20. The method according to claim 19, further including decommitting the order-invariant commitment by
   receiving a second input element (B) including a second sequence of at least one value $(b_1, \ldots, b_m)$ from the predetermined set (F);
   receiving the first sequence (E);
   constructing a derived set of values $(X'x_1', \ldots, x_m')$ representing respectively the at least one value $(b_1, \ldots, b_m)$ in the second sequence (B); and
   selecting a subset (E') of the coordinate sets $\{(x_i,y_i)\}$ in the first sequence (E) such that for each pair (x',z',y') in the subset (E'), the first value in the pair (x') lies in the derived set of values (X'); and
   applying an error-correcting function to the subset (E').

21. A computer-implemented method for creating an order-invariant fuzzy commitment, comprising:
   (a) receiving a first input element (A) comprising a sequence of at least one pair of values $(a_1,w_1)$, $(a_2,w_2), \ldots, (a_n,w_n)$ wherein each of the at least one $a_i$ values is from a first predetermined set (F) and each of the at least one $w_i$ values is from a second predetermined set (G);
   (b) generating a codeword (c) of an error-correcting code for generating the commitment;
   (c) constructing a first sequence (B) of coordinate sets $(x_i,z_i,y_i)$, for i in $\{1, \ldots, k\}$ for integer k>0, each of the coordinate sets having a first value $(x_i)$ corresponding to a representation of an associated one $((a_i,w_i))$ of the at least one pair of values of the first input element (A) and a second value $(x_i)$ constructed in a manner responsive to an associated one $((a_i,w_i))$ of the at least one value of the first input element (A) in the sequence $(a_i,w_i)$, $(a_2,w_2), \ldots, (a_n,w_n)$ and a third value $(y_i)$ corresponding to a subset of symbols in the codeword (c), wherein the subset of symbols is selected in a manner responsive to at least one of the first and second values of the coordinate set $(x_i$ and $z_i)$, wherein an order-invariant fuzzy commitment is formed;
   outputting the first sequence; and
   utilizing the first sequence, in response to receiving a second input element from a user, to authenticate the user to a secured system associated with the first sequence.

22. The method of claim 3, further including decommitting the order-invariant commitment by:
   receiving a second input element including a second sequence of at least one value $(b_1, \ldots, b_m)$ from the predetermined set, the second input element being derived from a measurement of a biometric associated with a user;
   receiving the first sequence;
   constructing a derived set of values $(X'=x_1', \ldots, x_m')$ representing respectively the at least one value $(b_1, \ldots, b_m)$ in the second sequence;
   selecting a subset of the coordinate sets $\{(x_i, y_i)\}$ in the first sequence (E) such that for each pair (x',y') in the subset, the first value in the pair (x') lies in the derived set of values (X');
   applying an error-correcting function to the subset; and
   authenticating the user to the secured system associated with the first sequence.

* * * * *

UNITED STATES PATENT AND TRADEMARK OFFICE
CERTIFICATE OF CORRECTION

PATENT NO. : 7,602,904 B2  
APPLICATION NO. : 09/994476  
DATED : October 13, 2009  
INVENTOR(S) : Juels et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Fifth Day of October, 2010

David J. Kappos  
*Director of the United States Patent and Trademark Office*